ABSTRACT OF THE DISCLOSURE

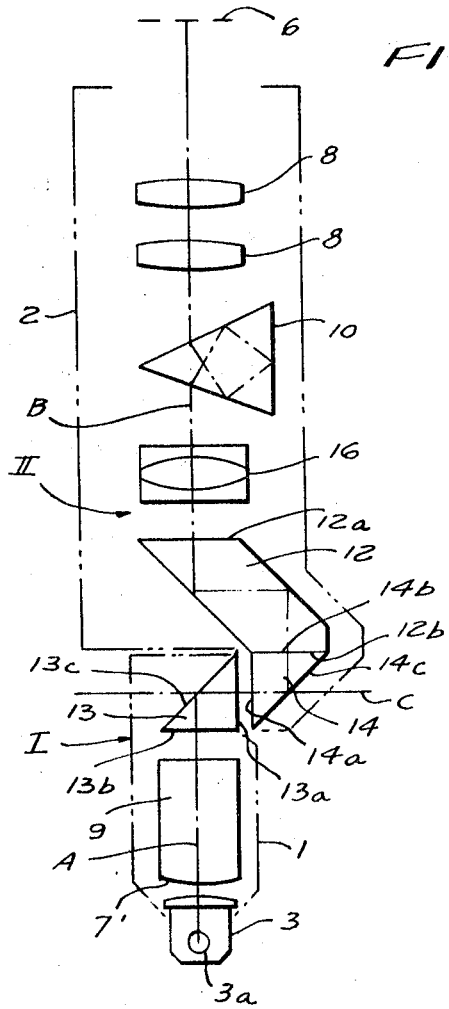
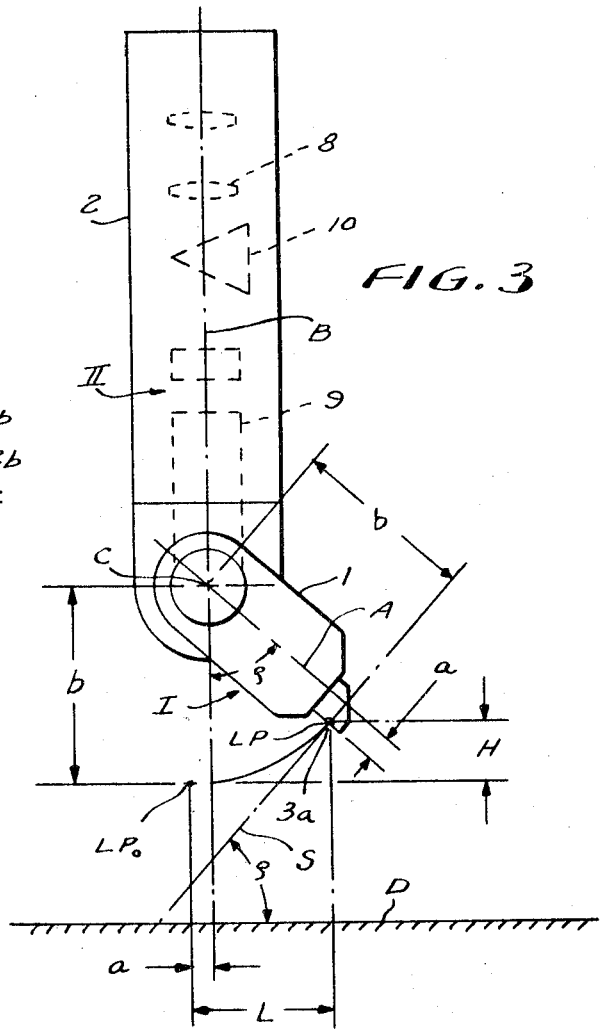
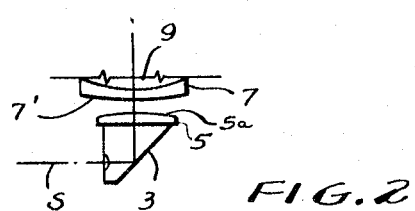
FIG. 1
FIG. 3
FIG. 2
INVENTORS
PAUL T. KAESTNER
SEYMOUR ROSIN
BY Bean, Brooks, Buckley & Bean
ATTORNEYS 3,459,465
OPTICAL SYSTEM FOR VISUAL FLIGHT SIMULATION
Seymour Rosin, Massapequa Park, and Paul T. Kaestner, Huntington, N.Y., assignors to Bell Aerospace Corporation, Wheatfield, N.Y.
Filed July 3, 1967, Ser. No. 650,760
Int. Cl. G02b 23/02
U.S. Cl. 350—49　　　　　　　　　　　　　　8 Claims

Pitch movements of an aircraft are simulated by turning a first optical assembly including a head prism, an objective, and a first right angle prism, relative to a second optical assembly including a second right angle prism, about an axis passing through the first and second prisms. The axis of the second assembly represents the yaw axis.

Cross-reference to a related application

The copending application, Ser. No. 440,219, filed by Seymour Rosin and entitled "Optical Scanning System," discloses related subject matter.

Background of the invention

The present invention relates to optical systems for simulating visual effects, and particularly visual effects occurring when an aircraft makes pitch motions, yaw motions, and roll motions.

Optical systems serving this purpose are known, and an improved system is disclosed in the copending application, Ser. No. 440,219.

In accordance with the prior art, the pitch motion is simulated by turning a first head prism relative to a second head prism. This construction has the disadvantage that it is difficult to simulate flight conditions as encountered by a low-flying aircraft in a valley between mountains, or requiring a close approach to a terrain model for simulating an aircraft landing.

Summary of the invention

It is one object of the invention to provide an optical system for visual flight simulation permitting simulation of a flight closely approaching terrain obstructions.

Another object of the invention is to provide an optical system for visual flight simulation requiring no adjustment of head prisms for the purpose of simulating a pitch motion.

With these objects in view, one embodiment of the invention comprises first and second optical assemblies having first and second optical axes and being connected for turning movement about a third axis intersecting the first and second axes at right angles.

The first assembly comprises a single head prism defining a line of sight intersecting the first optical axis at right angles, and being perpendicular to and spaced from the third axis. The first assembly further comprises an objective, and a first prism located at the point of intersection of the first and third axes for deflecting rays from the first optical axis in the direction of the third axis.

The second assembly comprises a second prism located in the third axis for deflecting rays from the third axis in a direction parallel to the second axis, and another prism, preferably a rhomboid prism, for deflecting the rays in the direction of the second optical axis.

By turning of the first assembly about the third axis, which represents the pitch axis, pitch movements relative to a yaw axis represented by the axis of the second assembly, are simulated.

In the preferred embodiment of the invention, the line of sight and the axes of first and second assemblies are located in a common plane, and the third axis is perpendicular to this plane. The first and second prisms are right-angle prisms having a pair of parallel lateral faces confronting each other.

In order to simulate roll motions, and to compensate unwanted image rotation introduced by both the pitch and yaw scanning actions, the second assembly includes a roll prism following the rhomboid prism and being turnable about the axis of the second assembly which represents the yaw or azimuth axis.

As compared with other optical systems or angular coordinate lenses for visual simulation which are customarily designed with the entrance pupils coincident with the yaw and pitch axes of rotation, the present invention places the third axis, representing the pitch axis, in a location which will permit a more compact configuration of the supporting means surrounding the entrance pupil of the optical system, which is of particular importance since the simulation of aircraft and spacecraft flight involves three linear, as well as three angular degrees of freedom.

The linear displacements introduced by pitch motions can be offset by the introduction of simultaneous linear motions to the entire lens system and/or the model under observation.

The optical system of the invention allows the look point or point of perspective to come very close to the model permitting landing or touch-down simulation. The look point occurs at the optical system entrance pupil located concentric with a concave surface and coplanar with the entrance face of the head prism. In contrast to the prior art, the third pitch axis does not pass through this look point, since it is located spaced from the head prism and the line of sight and on the other side of the objective in the first assembly.

The limited width of the head prism permits a realistic simulation of aircraft or spacecraft flight between mountains or other obstructions which is not possible with apparatus according to the prior art in which the pitch axis is located at the entrance pupil.

It is a basic geometrical law that rotation about a point can be produced by rotation about a second point accompanied by translation of the second point. Since the basic simulation problem involves three angular degrees of freedom, and three linear degrees of freedom, it becomes a relatively simple problem to shift the effective axis of rotation in pitch back to the look point by introduced corrective translational motions to movable carriage means supporting the optical system, or by causing linear motions of the terrain model under observation.

The generation of electric signals which are proportional to the three translatory motions needed to compensate for a displaced pitch axis, can be accomplished in a computer which provides the motion drive signals for the flight simulator, or the respective control signals can be generated at the servo drives for the angular coordinate lens using sine-cosine transducers such as resolvers or function potentiometers.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawing.

Brief description of the drawing

FIG. 1 is an exploded schematic front elevation illustrating an optical scanning system according to one embodiment of the invention, some conventional parts of the system being omitted for the sake of simplicity;

FIG. 2 is a fragmentary side elevation illustrating a detail of the embodiment of FIG. 1; and FIG. 3 is a side elevation of the embodiment of FIG. 1, and partially a diagrammatic illustration.

Description of a preferred embodiment

Referring now to the drawing, a first optical assembly I has a first optical axis A along which a head prism 3, a schematically shown objective 9 including a lens element 7, see FIG. 2, having a convex air surface 7′, and a right angle prism 13 are located. The optical elements of the first assembly are mounted in a schematically indicated housing 1.

A second optical assembly II has an optical axis B and comprises a second right angle prism 14, a rhomboid prism 12, a corrective focus lens 16, a roll motion prism 10, and converging lenses 8 which focus an aerial image in a focal plane 6 for optical observation through an eye piece, or the raster face of a television camera may be located in the focal plane. The optical elements 8, 10, 12, 14, 16 are mounted in a second schematically indicated housing 2.

Housing 1 with the entire first assembly is turnable relative to housing 2 about a third axis C which intersects the first optical axis A at right angles. Articulation prisms 13 and 14 are located along axis C and have confronting parallel lateral faces 13a and 14a located in corresponding windows of housings 1 and 2 so to be separated by an air gap.

In the illustrated position in which the first axis A coincides with the second axis B, pairs of corresponding faces 13a and 14a, 13b and 14b, and 13c and 14c are respectively parallel.

Head prism 3 has a planar face with a recess 3a having a concave surface. A cone of rays, represented by the line of sight S, enters through the concave recess 3a, and is deflected by the prism 3 to pass through the plano-convex lens 5 into lens element 7 of objective 9 whose construction is conventional, and not an object of the present invention.

The cone of rays entering through the concave recess 3a has an apex angle which is considerably greater than the angle of the cone of rays within head prism 3. A convex curved surface 5′ on the planoconvex lens 5, and a convex surface 7′ on lens 7 add a substantial amount of positive power to the optical system, and this positive power is compensated by the negative refractive power of the surface of the concave recess 3a which may have a small diameter since in that area, the beam passing through the prism has the smallest cross section. Due to this arrangement, the apex angle of the cone of rays entering the head prism 3 in the direction of the line of sight is greater than the apex angle of the rays entering lens 7 of the objective.

As is clearly apparent from FIGS. 1 and 2, the line of sight S intersects the first optical axis A at right angles at a point spaced from the point of intersection of the first axis A with the third axis C. The line of sight S and the first axis A define a plane which is perpendicular to the third axis C about which the first assembly I is turnable relative to prism 14 and the second assembly II.

The rays entering in the direction of the line of sight into head prism 3 are reflected by the same in the direction of the first axis A and again reflected by face 13c of prism 13 in the direction of the axis C to enter the second prism 14 where the rays are deflected by face 14c in a direction parallel to the direction of the second axis B. The rhomboid prism 12 has one end face 12a located in the optical axis B of the second assembly 11, and an end face 12b confronting lateral face 14b of prism 14 and being parallel to the same. The rays entering prism 12 are deflected to pass in the direction of the axis B through lens 16 into the roll prism 10 which is mounted in housing 2 for rotation. The rays deflected by roll prism 10 pass through the schematically indicated converging lens system 8 to the focal plane 6 where they form an image.

When the assembly I is turned about axis C, which represents the pitch axis of an aircraft, pitch motions of the aircraft are simulated relative to axis B which represents the yaw or azimuth axis of the aircraft. By rotation of prism 10, roll motions are simulated, but the roll prism 10 is also utilized for compensating unwanted image rotations which are introduced by both the pitch and yaw scanning actions.

Yaw or azimuth motion is simulated by rotating the first and second assemblies about the axis B which represents the yaw axis.

The rotation of the first optical assembly I about the axis C which represents the pitch axis, produces lateral and height displacements as represented by the following equations:

$$L = a(1 - \cos p) + b \sin p - a = b \sin p - a \cos p \quad (1)$$
$$H = b(1 - \cos p) + a \sin p - b = a \sin p - b \cos p \quad (2)$$

As shown in FIG. 3, the pitch angle $p$ is formed between the axis A of assembly I and the axis B of assembly II when housing 1 is angularly displaced. Axis B is perpendicular to the main plane D of a terrain model. As shown in the diagrammatic part of FIG. 3, L is the lateral displacement of the look point LP from its initial position $LP_0$, H is the vertical displacement of the look point, $a$ is the lateral parallax between the look point LP and the pitch axis C, $b$ is the veritcal parallax between the look point LP and the pitch axis C.

The lateral displacement of the yaw axis B may occur at any combination of X and Y depending on heading of the simulated vehicle. The following equations assume zero heading of the simulated aircraft or spacecraft to be along the Y axis:

$$X = (b \sin p - a \cos p) \sin \theta = L \sin \theta \quad (3)$$
$$Y = (b \sin p - a \cos p) \cos \theta = L \cos \theta \quad (4)$$

where X and Y are orthogonal components of lateral motion, and $\theta$ is heading angle (azimuth).

The look point or point of perspective LP is located at the entrance face of head prism 3 concentric with the concave surface of recess 3a and in the light of sight S. In contrast to the prior art, the three axes of rotation do not intersect at the look point.

It is assumed that the functions required to produce the linear compensating motions will be generated by the simulation computer.

To summarize, the single head prism 3 has a concave entrance surface 3a to achieve the advantage of a wide entrance cone of the image forming light rays. Head prism 3 reflects the light cone through a 90 degree angle, and the reflected beam is directed coaxial with the objective 9 whose optical axis A intersects the yaw axis B, or may coincide with the same. The cone of rays emerging from the exit side of the objective is again diverted through a 90-degree angle along the pitch axis C which is mutually orthogonal to both the line of sight S, and optical axis A. The assembly I is rotated about the pitch axis C to produce pitch or elevation motion of the optical image at the focal plane 6. The second right angle prism 14 and the rhomboid prism 12 provide multiple deflections to return the optical axis to a position coaxial with the yaw or azimuth axis B.

By way of example, in a practical embodiment of the invention, the following materials and data are applicable for the entrance parts of the optical system.

Head prism 3 is advantageously made of a glass of the type LaSF3 having a refractory index of 1.8069. The sides of the square prism faces of the head prism are preferably 6.6 mm. long. A radius of curvature of the concave refracting surface of recess 3a is preferably 7.78 mm. and its diameter about 2 mm. The radius of curvature of the convex surface 5' is preferably 12.25 mm., lens 5 being made of the same glass as head prism 3. Lens 7 is made of a glass material SF10 having a refractive index of 1.7283, and a radius of curvature of surface 7' is 22.59 mm. The indices of refraction given above refer all to the wave length of the D-line of the spectrum.

It will be understood that each of the elements described above, or two or more together, may also find a useful application in other types of optical scanning systems for simulating flight conditions differing from the types described above.

While the invention has been illustrated and described as embodied in an optical system for visual flight simulation in which pitch motions are simulated by turning a first optical assembly including a first prism relative to a second optical assembly including a second prism about a pitch axis passing through the first and second prisms, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an optical system for visual flight simulation, in combination,
    first and second optical assemblies having first and second optical axes, respectively, and being connected for turning movement about a third axis intersecting said first and second axes at right angles,
    said first assembly comprising a head prism having an entrance face for receiving an incoming cone of rays having an axis defining a line of sight intersecting said first optical axis at right angles and lying within a plane containing said first optical axis and perpendicular to said third axis, an objective, and a first prism located at the point of intersection of said first and third axes for deflecting rays from said first optical axis in the direction of said third axis, said first assembly being rotatable about said third axis for simulating pitch motion,
    said second assembly comprising a second prism located in said third axis for deflecting rays from said first prism and said third axis in a direction parallel to said second axis and other prism means for deflecting rays from said parallel direction in the direction of said second optical axis,
    and the entrance pupil point of the system being located along said first optical axis in the plane of said entrance face of the head prism.

2. In an optical system as defined in claim 1 wherein the point of intersection between said first and third axes lies along an extension of said second axis.

3. In an optical system as defined in claim 2 wherein said first assembly also includes lens means for introducing positive power into the system, said lens means being located in the region between said head prism and said objective, and said entrance face of the head prism having a concave surface portion introducing negative power into the system compensatory of said positive power, said concave surface being concentric with respect to said entrance pupil point.

4. In an optical system as defined in claim 1 wherein said first assembly also includes lens means for introducing positive power into the system, said lens means being located in the region between said head prism and said objective, and said entrance face of the head prism having a concave surface portion introducing negative power into the system compensatory of said positive power, said concave surface being concentric with respect to said entrance pupil point.

5. An optical system as claimed in claim 1 wherein said first and second prisms are right angle prisms having confronting lateral faces parallel to each other.

6. An optical system as claimed in claim 1 wherein said other prism means is a rhomboid prism having parallel end faces, one end face confronting said second prism and the other end face being located in said second axis.

7. An optical system as claimed in claim 1 wherein said second assembly also includes a roll motion prism following said other prism means and being mounted for rotation about said second axis for simulating roll movements, and for compensating unwanted image rotation.

8. An optical system as claimed in claim 1 wherein said first and second prism are right angle prisms having confronting lateral faces parallel to each other; wherein said other prism means is a rhomboid prism having parallel end faces, one end face being parallel to a lateral face of said second prism, and the other end face being located in said second axis; and wherein said second assembly comprises a roll motion prism following said rhomboid prism and being mounted for rotation about said second axis for simulating roll movements, and for compensating unwanted image rotation.

References Cited

UNITED STATES PATENTS

| | | | |
|---|---|---|---|
| 1,607,688 | 11/1926 | Perrin et al. | 350—22 X |
| 1,798,396 | 3/1931 | Bauersfeld et al. | 350—138 |
| 2,431,290 | 11/1947 | Wildermann | 350—48 X |
| 2,866,382 | 12/1958 | Gruner et al. | 350—136 |
| 3,367,046 | 2/1968 | Neuberger | 35—12 |

DAVID SCHONBERG, Primary Examiner

PAUL R. GILLIAM, Assistant Examiner

U.S. Cl. X.R.

35—12; 350—22, 50, 136